Oct. 9, 1956 C. A. REIMSCHISSEL ET AL Re. 24,225

DIE HEAD WITH ECCENTRIC CIRCULAR LATCH

Original Filed Nov. 26, 1952

INVENTORS

CHARLES A. REIMSCHISSEL

DONALD E. YOUTZ

BY Strauch, Nolan & Diggins

ATTORNEYS

United States Patent Office

Re. 24,225
Reissued Oct. 9, 1956

24,225

DIE HEAD WITH ECCENTRIC CIRCULAR LATCH

Charles A. Reimschissel, Ozona, Fla., and Donald E. Youtz, Waynesboro, Pa., assignors to Landis Machine Company, Waynesboro, Pa., a corporation of Pennsylvania Original No. 2,739,322, dated March 27, 1956, Serial No. 322,644, November 26, 1952. Application for reissue July 26, 1956, Serial No. 600,360

7 Claims. (Cl. 10—95)

Matter enclosed in heavy brackets [ ] appears in the original patent but forms no part of this reissue specification; matter printed in italics indicates the additions made by reissue.

This invention relates to thread cutting mechanism and particularly to self opening die heads for use on automatic screw machines, threading machines or the like.

The die head embodying the present invention is an improvement over that shown and described in United States Letters Patent No. 2,291,919, issued August 4, 1942 to C. A. Reimschissel. In that construction, the die head is locked in thread cutting position by means of a pair of small latch members inserted in the adjusting ring of the die head and cooperating with latching abutments on the adjacent surface of the closing ring. Due to the frequent and rapid operation of the die head in service, the narrow latch inserts wear rapidly and relatively frequent replacement is necessary. The abutment surfaces of the large and expensive closing ring are also worn rapidly and although this wear is distributed over a larger area, such die heads are often employed for long periods on a single size of work, resulting in the concentration of wear at a single spot on the closing ring.

While it has previously been attempted to obviate this disadvantage by the use of a latch member of wider arcuate or semi-circular form such as is shown, for example, in the U. S. Patent to Breitenstein, No. 1,753,848 issued April 8, 1930, such attempts have introduced even more undesirable disadvantages by employing an unbalanced latching engagement on only one side of the axis of the die head. As a consequence, the forces encountered in the thread cutting operation tend to rock the forward portion of the die head about the latching abutment, forcing one chaser nearer the axis of the die head than the others. The result is an uneven cutting condition detrimental to the quality of the product and necessitating frequent work stoppages for the purpose of sharpening the one chaser which is doing most of the cutting.

It has also been proposed, as for example in the U. S. Patent to Drissner, No. 2,130,119, issued September 13, 1938, to lock a die head in thread cutting position by means of oppositely directed latches having broad wearing surfaces and operating on diametrically opposite sides of the die head axis. This system involves the use of a multiplicity of springs which, for completely satisfactory operation of the die head, must operate exactly uniformly, which is practically never the case. Moreover, failure of one spring to act results in the same unbalanced latching condition described in the preceding paragraph.

The present invention overcomes all of these disadvantages by providing a latch having an effective engagement virtually entirely around the axis of the die head, thus eliminating the possibility of any tilting or canting of the die head and closing ring on the latching abutments. Further the novel latching mechanism provides extremely broad wearing surfaces to distribute the wear over the largest possible area on both the latch member and its seating surface. Operation of this device by a single spring insures accurate latching of the die head at all times and a partially latched condition permitting canting of the closing ring is impossible.

Accordingly it is an object of the invention to provide a latching mechanism for a die head, having an extensive area of latching engagement, said area being balanced to oppose cutting forces in an axial direction without a bending moment.

Another object of the invention is to provide a latch for rigidly locking a die head, which latch is in one piece, yet capable of having a latching engagement substantially surrounding the axis of the die head.

A further object is to provide a die head latching member in the form of a ring encircling the die head body and having latching engagement on opposite sides of the head body, the latching member being operated by a single spring.

It is another object of the invention to provide a latching member as described above and further capable of being repositioned after extensive wear to bring into operation new, unworn latching surfaces.

The scope of the invention also encompasses a die head construction capable of employing such latching mechanism to best advantage and the provision of mechanism which will most freely and without binding transmit the cutting forces to the latching abutments where they are opposed by the latch member.

Further objects and advantages will be apparent from a study of the following description of the invention and the accompanying drawings in which.

Figure 3:
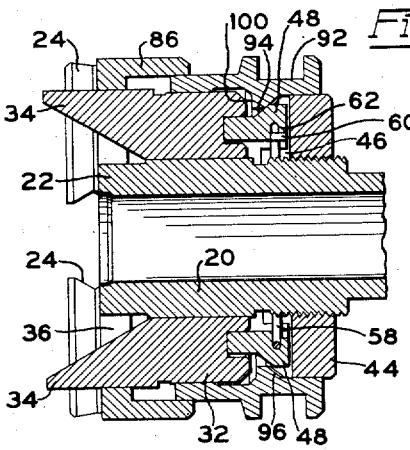
Figure 3 is a longitudinal section similar to Figure 2, but showing the die head in open position.

The die head comprises a head body 20 having at the rear end a hollow shank portion which may be adapted to fit the machine tool spindle in which the die head is to be used. At its other or forward end, the head body 20 is formed with an enlarged portion 22 provided with a plurality of dovetail slideways 24 wherein are mounted, for radial sliding movement, chaser holders 26, herein shown as four in number. Tangential chasers 28 are secured in operative position in chaser holders 26 by means of clamps 30 and clamping screws 31 in well known manner.

Figure 2:
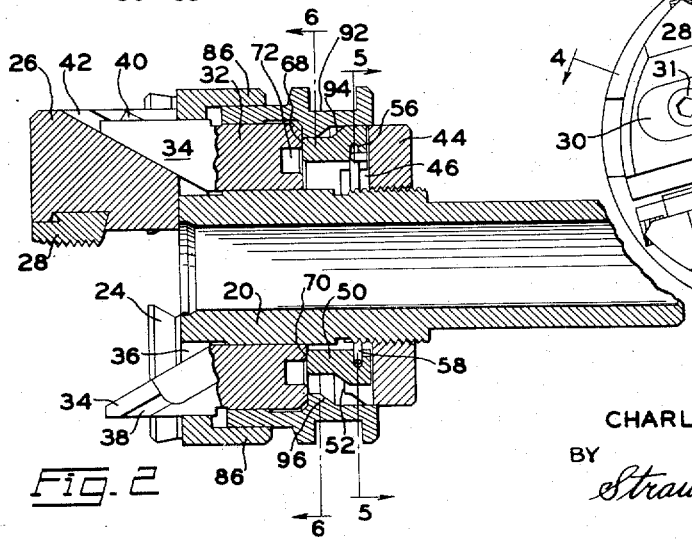
Figure 2 is a longitudinal sectional view taken along line 2—2 of Figure 1, showing the die head in closed or thread-cutting position.
Figure 1:
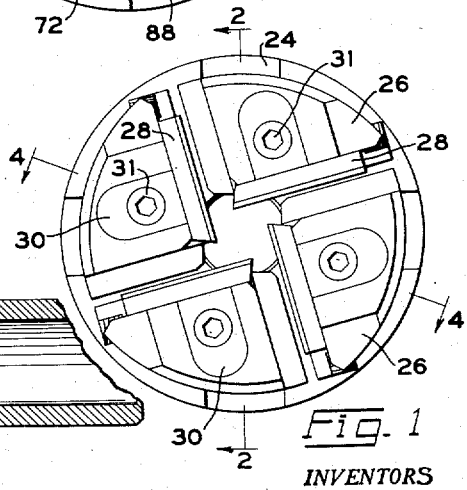
Figure 1 is a front elevation of a die head embodying the invention.

The radial sliding movement of chaser holders 26 is effected and controlled by a closing ring 32, slidably mounted on head body 20 rearwardly adjacent enlarged portion 22. As shown in Figure 2, closing ring 32 is provided with forwardly projecting prongs 34, one for each chaser holder, which extend through openings 36 in enlarged head body portion 22 into slideways 24. Each prong 34 has an inclined cam groove 38 for engagement with an inclined key 40 formed on the interior of a suitable slot 42 in each chaser holder 26. Thus it is seen that axial movement of closing ring 32 produces radial movement of chaser holders 26 for moving chasers into or out of thread-cutting position or for adjusting the cutting position to various work diameters.

An adjusting ring 44 is threadedly engaged upon head body 20 rearwardly of closing ring 32. The forward surface of adjusting ring 44 is interrupted by a rectangular groove 46 (see Figs. 2 and 5) extending diametrically thereacross. The groove 46 is occupied, on opposite sides of the head body 20, by a pair of lugs 48 which are formed as integral axial projections from a latch ring 50. This latch ring 50 surrounds head body 20 and rests against the forward surface 52 of the adjusting ring 44.

Figure 5:
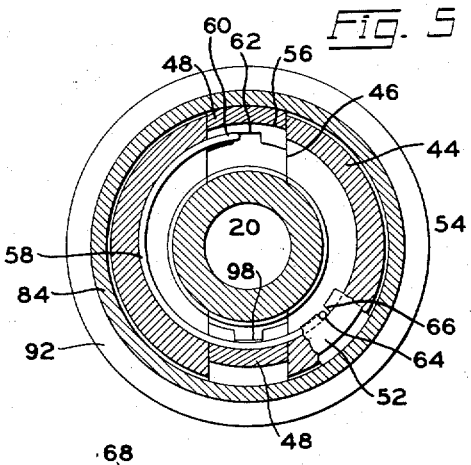
Figure 5 is a transverse section taken along line 5—5 of Figure 2.
Figure 4:
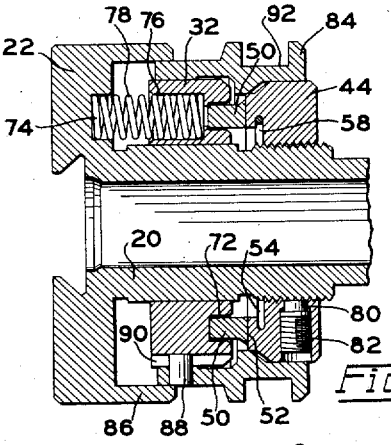
Figure 4 is another longitudinal sectional view taken along line 4—4 of Figure 1.

As shown in Figures 4 and 5, a circular groove 54 is formed in the interior of adjusting ring 44 to intersect the rectangular groove 46. Moreover, the circular groove 54 is eccentric with relation to the adjusting ring 44 with the direction of maximum eccentricity aligned with the rectangular groove 46. Each lug 48 is correspondingly grooved as at 56 to match, in axial position, the circular groove 54. A torsion spring 58 is mounted in the grooves 54 and 56 to unite the lugs 48 of the latch ring 50 and the adjusting ring 44 and prevent relative movement between these two rings in an axial direction. One end 60 of spring 58 is keyed in one of the lugs 48, a notch 62 being provided in the lug for this purpose. It will be noted from Figure 5 that the lug 48 in which the spring end 60 is keyed occupies that portion of groove 46 at which the eccentric circular groove 54 is farthest from the axis of the die head. The other end 64 of spring 58 is keyed in the adjusting ring 44, a notch 66 for this purpose extending from the circular groove 54 to the forward surface 52 of the ring.

Figure 6:
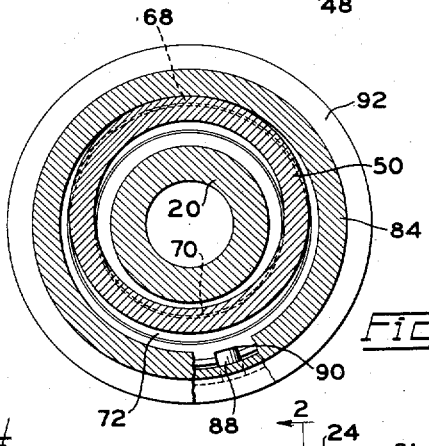
Figure 6 is a transverse section taken along line 6—6 of Figure 2.

The latch ring 50 is formed with considerable clearance between it and the head body 20 so that the spring 58, by virtue of its connection with a lug 48, can force the latch ring 50 into the position shown in Figures 2 and 6, that is, eccentric to the die head axis. In this position, the forward surface of latch ring 50 is in contact with the ledges 68 and 70 on the rearward surface of the closing ring 32. Ledges 68 and 70 are portions respectively of the outer and inner annular lands remaining after the formation of a circular groove 72 in the rear surface of closing ring 32, ledge 68 being on the outside of groove 72 and ledge 70 being inside groove 72 and diametrically opposite ledge 68.

In the rearward surface of head body portion 22 and in the forward surface of closing ring 32 are formed a plurality of circular recesses 74 and 76 respectively (Figure 4) in which compression springs 78 are mounted. It will be seen that the springs 78 constantly urge closing ring 32 rearwardly against latch ring 50, which, as mentioned above, is retained against the forward surface of adjusting ring 44. Because the latter ring is threadedly engaged upon head body 20, the force of spring 78, transmitted through closing ring 32, and hence the chasers 28 are held rigidly in thread-cutting position by the contact between latch ring 50 and ledges 68 and 70 on closing ring 32. As in certain prior constructions, adjusting ring 44 is held in adjusting position by means of a plug 80 and set screw 82, mounted in a radially directed opening in adjusting ring 44 and bearing upon the threaded portion of head body 20.

The die head is opened and closed by means of an operating ring 84, mounted to surround the adjusting ring 44, latch ring 50 and closing ring 32. A rearwardly directed flange 86, integral with enlarged portion 22 of head body 20 overlaps the forward portion of operating ring 84 to completely seal the interior mechanism of the die head against chips, dirt, and other foreign matter. The operating ring 84 is keyed for unitary rotation with the remainder of the die head by means of a radial pin 88 (Figure 4) mounted in the forward portion of said ring to engage a longitudinal slot 90 in the periphery of closing ring 32. A peripheral groove 92 is formed in the operating ring 84 for engagement by the usual yoke (not shown) for shifting the operating ring axially to open or close the die head as desired.

A beveled surface 94 is formed on each of the lugs 48 of latch ring 50 and a cooperating bevel 96 of substantially the same inclination is formed on the interior of operating ring 84. Since the spring 58 urges the latch ring 50 transversely of the axis of the die head and toward the top as seen in Figure 2, the latch ring 50 will be urged against the interior of operating ring 84 at this point and the inclined surfaces 94 and 96 will be laterally adjacent each other. Then, upon movement of the operating ring 84 toward the rear, the inclined surface 96 of the operating ring will contact the inclined surface 94 of the latch ring 50, forcing the latch ring downwardly as viewed in Figure 2 against the force of spring 58.

This movement continues until the latch ring is forced out of contact with ledge surfaces 68 and 70, allowing the springs 78 to expand and move the closing ring 32 rearwardly. The forward portion of the latch ring 50 consequently enters the circular groove 72 and contact of the latch ring with the bottom of groove 72 stops the rearward movement of the closing ring 32. The camming connection between closing ring 32 and chaser holders 26 has meanwhile caused the chaser holders and chasers 28 to be withdrawn radially away from the threaded work piece and the parts of the die head come to rest in the position shown in Figures 3 and 4. This position permits the rapid axial separation of die head and work piece and is generally referred to as the "open" position of the die head.

As above explained, the ledges 68 and 70, together with surfaces of similar area and extent on the forward face of latch ring 50, constitute the latching abutments on the die head. As shown in Figure 6, the areas of latching contact of these surfaces extend almost entirely around the head body 20 and thus effectively prevent any tilting of the forward portion of the die head when the head is in closed or thread cutting position. As shown in Figure 2, bevels are provided at the inner and outer corners of both latch ring 50 and groove 72 in order to prevent chipping of these corners during the opening of the die head.

A further feature of the novel latch ring member 50 lies in the fact that it may be reversed, top or bottom as shown in Figure 2, so that when the areas shown in contact with ledges 68 and 70 become worn they may be replaced with unworn areas without any replacement of head parts. For this reason, a second notch 98 is provided in the lug 48 opposite to notch 62 for perform the function of the latter when the latch ring is reversed. It will also be noted that operation of the latch ring by a single spring effects a positive latched condition or, if the spring 58 is broken, the die head will remain in open position. No insecure, inaccurate intermediate position is possible.

To close the die head to thread cutting position, a yoke or other well-known means is employed to force the operating ring 84 forwardly. The internal shoulder 100 of the operating ring 84 engages the rear surface of the closing ring 32, carrying the said closing ring forward also and compressing the head opening springs 78 while latch ring 50 and adjusting ring 44 remain axially stationary due to the threaded connection between the latter and head body 20. At this time the camming connection 38, 40 between chaser holders 26 and the prongs 34 of closing ring 32 causes the chaser holders to be moved radially inwardly to thread-cutting position. When this position is reached, latch ring 50 will be entirely withdrawn from the groove 72 and the spring 58 will operate to move the latch ring 50 transversely of the die head axis into contact with the interior of the operating ring 84, substantially as shown in Figure 2. A slight additional forward movement of closing ring 32 is advisable to permit the latch ring 50 to move transversely without binding on the rear surface of the closing ring. When the latch ring 50 has contacted the interior of the operating ring 84, the latter is released by the yoke and the parts are returned to thread cutting position as shown in Figures 2, 5, and 6.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a thread cutting die head; a body member provided with a relatively fixed abutment; an axially shiftable chaser holder closing ring mounted on said body member and resiliently biased toward said abutment in axial alignment therewith, said closing ring having first and second annular radial surfaces offset axially and facing said abutment; a locking ring extending around the axis of the die head positioned between said closing ring and said abutment and having annular front and rear faces, means to bodily displace said locking ring laterally of said die head between a first position to dispose the front face thereof in engagement with the first surface on said closing ring and a second position to dispose the front face thereof in engagement with said second surface of said closing ring, the rear face of said locking ring being engaged with said abutment in both positions whereby said locking ring is fixed against axial movement, the respective areas of engagement between said locking ring and said first and second surfaces and between said locking ring and said abutment being disposed at least in any three selected quadrants about the axis of said head.

2. The combination defined in claim 1 wherein said locking ring is symmetrical so that it may be operatively interposed between said closing ring and said abutment in either of two positions.

3. In a thread cutting die head; a body member provided with a relatively fixed abutment; a chaser holder closing ring mounted on said body for axial displacement toward said abutment to effect opening of said chaser holders and away from said abutment to effect closure thereof; means resiliently biasing said closing ring toward said abutment, said closing ring having first and second annular radial surfaces off-set axially and facing said abutment; a locking ring extending around the axis of the die head positioned between said closing ring and said abutment and having annular front and rear faces, said locking ring being bodily displaceable laterally of said die head between a first position to dispose the front face thereof in engagement with the first surface on said closing ring and a second position to dispose the front face thereof in engagement with said second surface of said closing ring, the rear face of said locking ring being engaged with said abutment in both positions whereby said locking ring is fixed against axial movement, the respective areas of engagement between said locking ring and said first and second surfaces and between said locking ring and said abutment being disposed at least in any three selected quadrants about the axis of said head; a spring resiliently biasing said locking ring to said first position, and an axially displaceable operating ring operable when moved in one direction to laterally displace said locking ring in opposition to said spring to move said locking ring to said second position and upon movement in the opposited irection to axially displace said closing ring away from said abutment to permit lateral displacement of said locking ring under the influence of said spring to said first position.

4. In a thread cutting die head; a body member provided with a relatively fixed annular abutment; an axially shiftable chaser holder closing ring mounted on said body member and resiliently biased toward said abutment in axial alignment therewith, the face of said closing ring adjacent said abutment being formed with an annular recess; a locking ring extending around the axis of said die head positioned between said closing ring and said abutment and having parallel front and rear faces, means to bodily displace said locking ring laterally of said die head between a first position to dispose the front face thereof in annular engagement with the bottom wall of said recess and a second position to dispose said front face in engagement with portions of the rear face of said closing ring substantially entirely about the axis of said die head, the *major portion of the* rear face of said locking ring being in [annular] *surface* engagement with said abutment in both positions whereby said locking ring is fixed against axial movement and canting of the chaser holder ring and associated chasers with respect to said body is prevented.

5. In a thread cutting die head; a body member provided with a relatively fixed abutment; an axially shiftable chaser holder closing ring mounted on said body and resiliently biased toward said abutment in axial alignment therewith, said closing ring having an annular groove facing said abutment formed between inner and outer lands; a locking ring extending around the axis of the die head between said closing ring and said abutment and having front and rear faces, means to bodily displace said locking ring laterally between a first position to dispose the front face thereof in engagement with the bottom of said groove substantially around the axis of said die head and in a second position to dispose arcuate portions of said front face in engagement with said outer land substantially around one side of the axis of said closing ring and with the inner land substantially around the opposite side of the axis of said closing ring, the *major portion of the* rear face of said locking ring being in [annular] *surface* engagement with said abutment in both positions.

6. The die head according to claim 5 in which the locking ring is symmetrical whereby it may be rotated 180° with respect to said closing ring to provide alternate arcuate portions of said front face for engagement with the lands on said closing ring.

7. In a thread cutting die head; a body member provided with a relatively fixed abutment; an axially shiftable chaser holder closing ring mounted on said body member and resiliently biased toward said abutment in axial alignment therewith, said closing ring having first and second annular radial surfaces offset axially and facing said abutment; a locking ring extending around the axis of said die head positioned between said closing ring and said abutment and having annular front and rear faces, means to bodily displace said locking ring laterally of said die head between a first position to dispose the annular front face thereof in engagement with the first surface on said closing ring substantially entirely about the axis of said die head and a second position to dispose the annular front face thereof in engagement with said annular second surface of said closing ring in surface contact substantially entirely about the axis of said die head, the *major portion of the* rear face of said locking ring being in [annular] surface engagement with said abutment in both positions whereby said locking ring is fixed against axial movement to prevent the canting of said chaser holder closing ring with respect to said body.

References Cited in the file of this patent or the original patent

UNITED STATES PATENTS

| | | |
|---|---|---|
| 1,563,108 | Prance | Nov. 24, 1925 |
| 1,639,712 | Strickland | Aug. 23, 1927 |
| 2,291,919 | Reimschissel | Aug. 4, 1942 |